Feb. 6, 1968 ISAO KOZU 3,367,664

PHONOGRAPH

Filed June 3, 1965 5 Sheets-Sheet 1

INVENTOR

Isao Kozu

BY Stevens, Davis, Miller & Mosher

ATTORNEYS

INVENTOR
Isao Kozu
BY Stevens, Davis, Miller & Mosher
ATTORNEYS

Feb. 6, 1968 ISAO KOZU 3,367,664

PHONOGRAPH

Filed June 3, 1965 5 Sheets-Sheet 3

INVENTOR

Isao Kozu

BY Stevens, Davis, Miller & Mosher

ATTORNEYS

INVENTOR
Isao Kozu
BY Stevens, Davis, Miller & Mosher
ATTORNEYS

Feb. 6, 1968 ISAO KOZU 3,367,664

PHONOGRAPH

Filed June 3, 1965 5 Sheets-Sheet 5

INVENTOR

Isao Kozu

BY Stevens, Davis, Miller & Mosher

ATTORNEYS 3,367,664
Patented Feb. 6, 1968

3,367,664

PHONOGRAPH

Isao Kozu, Osaka, Japan, assignor to Matsushita Electric Industrial Co., Ltd., Osaka, Japan, a corporation of Japan Filed June 3, 1965, Ser. No. 461,124
Claims priority, application Japan, June 6, 1964, 39/32,274; June 6, 1964 (utility model), 39/45,017; Nov. 21, 1964 (utility model), 39/90,909; Dec. 4, 1964 (utility model), 39/95,672; Dec. 26, 1964, 39/73,380; Dec. 26, 1964 (utility model), 39/100,-791; Dec. 28, 1964, 39/74,157
18 Claims. (Cl. 274—14)

This invention relates to phonographs and more particularly to those of the structure in which the pickup needle is adapted to move on the straight line from the edge of a record to the center thereof and the tone arm is arranged to automatically return to its rest position after completion of the reproduction of a record.

In conventional phonograph constructions, a phonograph pickup is mounted on an arm which is pivotally secured at one end thereof to a fixed support, so that the needle can trace the record groove forming an arc. The angle between the longitudinal center line of the pickup and the tangent line of the groove at the point contacted by the needle changes as the needle travels and these changes in the said angle would cause tracking errors. These tracking errors, in turn, would cause tracking distortions.

The offset arm, which is commonly used to reduce the tracking errors, produces the inside force with the result that it increases the undesirable side pressure betweeen the needle and the record groove.

In order to correct such undesirable condition and to eliminate the tracking errors, various attempts have heretofore been made. For example, a tone arm has been employed which is supported on the carriage that can move on ball bearings to eliminate such tracking errors, but has exhibited much more friction than with the conventional pivoted tone arm. This will mean that the transverse pressure inflicted upon both the needle and the record groove is intensified and would cause the needle to leap off the record groove. This is the reason why supports that can effectively be used with phonograph pickups for operation particularly with a light vertical force on the needle of only one gram are not yet available.

It is an object of the present invention to provide a novel pickup support means which is simple in construction and by which the needle can move on the straight line from the edge of a record to the center thereof.

Another object of the present invention is to provide a pickup support means which moves smoothly by other force than the pressure imparted to the needle by the lead of the spiral record groove.

Still another object of the present invention is to provide means for automatically urging the tone arm to its rest position at the completion of reproduction of a record.

A further object of the present invention is to provide a mechanism which initiates the automatic return operation of the tone arm to its rest position without imparting any undesirable side pressure to the pickup needle when the quick feed is applied to the pickup needle by the lead-out groove of a record.

A still further object of the present invention is to provide means for automatically urging the tone arm to its rest position from any intermediate position during reproduction of a record.

A yet further object of the present invention is to provide a mechanism which is operative in association with the automatic return operation of the tone arm to its rest position to cause smooth movement of a carriage having the tone arm pivotally mounted thereon.

A still further object of the present invention is to provide a mechanism which is operative to turn off the source switch for a turntable driving motor as soon as the tone arm returns to its rest position.

Still another object of the present invention is to provide a change-over mechanism by which the means for automatically returning the tone arm to its rest position can selectively be made operative or inoperative to permit the manipulation of the tone arm solely by manual means.

The above and other objects, features and advantages of the present invention will be pointed out in and be apparent from the following description with reference to the accompanying drawings, in which.

Figure 1:
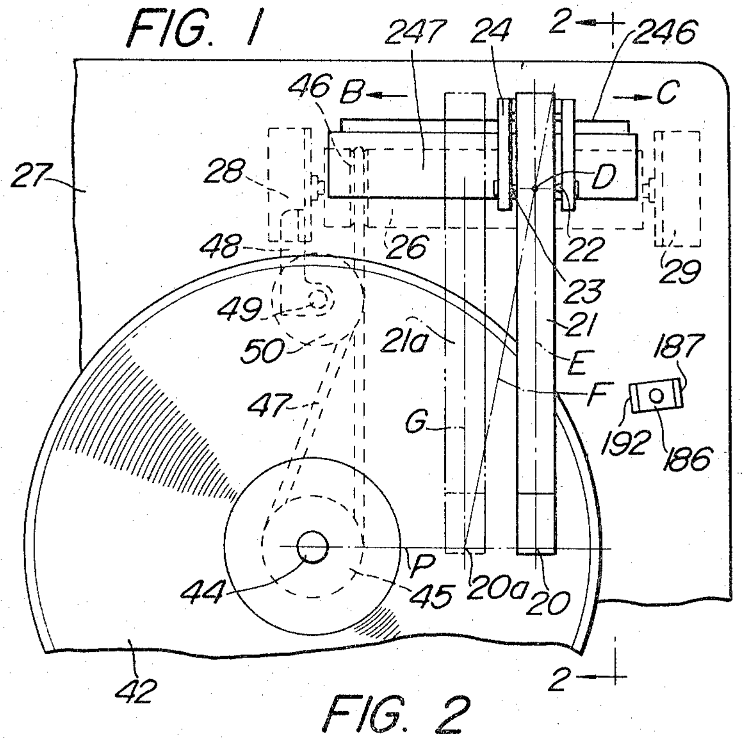
FIG. 1 is a plan view of part of the phonograph embodying the present invention.
Figure 2:
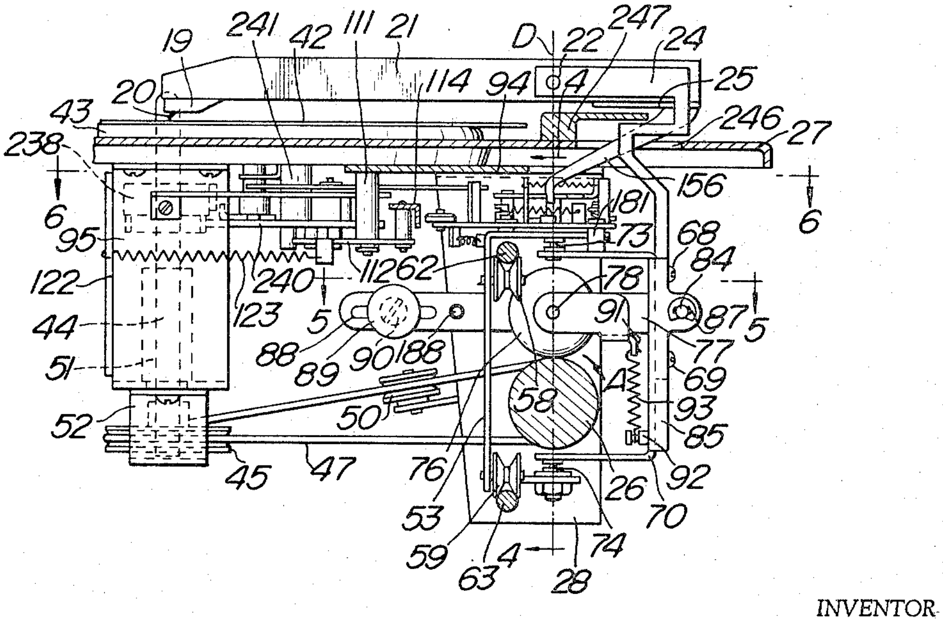
FIG. 2 is a vertical sectional view taken along the line 2—2 in FIG. 1.
Figures 3, 4, 5:
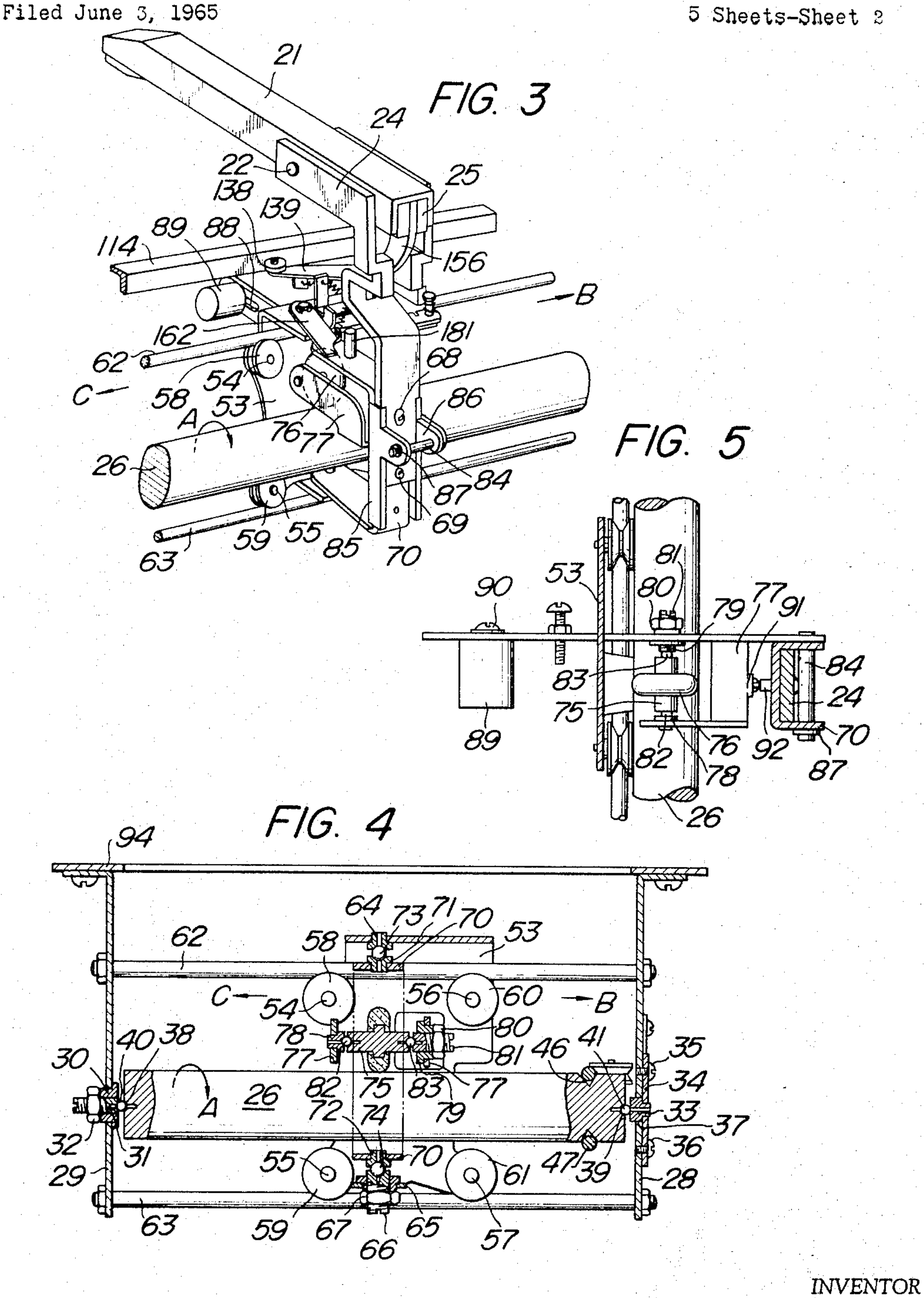
FIG. 3 is a perspective view of a tone arm assembly of the present invention.
FIG. 4 is a vertical sectional view taken along the line 4—4 of FIG. 2.
FIG. 5 is a partial cross-sectional view taken along the line 5—5 in FIG. 2.

Referring now to FIG. 1, FIG. 2 and FIG. 4 a needle 20 of a pickup 19 is mounted on a tone arm 21 which is supported by a bracket 24 for vertical pivotal movement about pivots 22 and 23, and a counter-weight 25 balances the weight of the tone arm 21 so that a suitable vertical force is imparted to the needle 20.

A cylinder 26 is rotatably supported by side plates 28 and 29 fitted to a sub-chassis 94 securely fixed to a phonograph chassis 27. To explain the structure of this part of the device in more detail, the side plate 29 has fixed therein an internally threaded hub 30 with which a screw 31 having a conically recessed end is engaged and set in position by a nut 32. A plate 34 is fixed to the side plate 28 by screws 35 and 36 and has a step bearing 33 having a conically recessed end fixed therein. The side plate 28 has a bore 37 in which the step bearing 33 is received in movable fit relation. The cylinder 26 is provided at opposite ends with conical recesses 38 and 39, and two steel balls 40 and 41 are interposed between the conical recess 38 and the screw 31, and between the conical recess 39 and the step bearing 33, respectively. The screw 31 is suitably adjusted and set in position by the nut 32 to insure smooth rotation of the cylinder 26.

A V-shaped pulley 45 is fixed on a spindle 44 of a turntable 43 on which a record 42 is mounted. An endless rope 47 is passed between the V-shaped pulley 45 and a V-groove 47 on the cylinder 26 so that the cylinder is normally rotated in a direction of arrow A. A guide pulley 50 is rotatably mounted on a fixed shaft 49 on a bracket 48 secured to the side plate 28 in order to guide the movement of the endless rope 47 so that the endless rope 47 may not slip off the V-shaped pulley 45 and the V-groove 46 on the cylinder 26.

The radial load applied to the spindle 44 is carried by a bearing 51 secured to a U-shaped bracket 95 fitted to the chassis 27 while the thrust load applied to the spindle 44 is carried by a U-shaped support 52 secured to the U-shaped bracket 95.

Referring to FIGS. 3 and 4, four shafts 54, 55, 56 and 57 are fixed to a carriage 53 and have respective guide rollers 58, 59, 60 and 61 rotatably mounted thereon. Two guide bars 62 and 63 are also provided to extend between the side plates 28 and 29. Therefore, the carriage 53 is movable in a direction of arrow B or C by being guided by these guide rollers and guide bars. A step bearing 64 having a conically recessed end is fixed to the upper panel portion of the carriage 53, while an internally threaded hub 65 is fixed to the lower panel portion of the carriage 53 and a screw 66 having a conically recessed end is engaged in the hub 65 and set in position by a nut 67. The bracket 24 supporting the tone arm 21 is secured to another bracket 70 by screws 68 and 69. Step bearings 71 and 72 each having a conically recessed end are fixed to the upper and lower panel portions of the bracket 70, respectively. Two steel balls 73 and 74 are interposed between the step bearing 71 and the step bearing 64 on the carriage 53 and between the step bearing 72 and the screw 66 on the carriage 53, respectively. The screw 66 is suitably adjusted and set in position by the nut 67 so as to permit free smooth rotation of the bracket 70 about a dot-dash line D in FIG. 2.

A roller 76 of a material such as rubber is bonded or otherwise fixed on a shaft 75 having its opposite ends also conically recessed. A step bearing 78 having a conically recessed end is fixed to one side of an arm 77, while an internally threaded hub 79 is fixed to the other side of the arm 77 and is in screw threaded engagement with a screw 81 having a conically recessed end, which screw 81 is set in position by a nut 80. Two steel balls 82 and 83 are likewise interposed between the conically recessed ends of the shaft 75 and the conically recessed ends of the step bearing 78 and the screw 81, respectively, to hold the shaft 75 therebetween so that suitable adjustment of the screw 81 can permit free smooth rotation of the roller 76.

In FIGS. 2 and 3, it will be seen that a shaft 84 is fixed to one end of the arm 77 and is rotatably mounted in panel portions 85 and 86 of the bracket 70 by a half-moon retainer 87, thereby permitting vertical pivotal movement of the arm 77. A slot 88 is provided at the other end of the arm 77 and a balance weight 89 is fixed in ahe slot 88 by a screw 90 in such manner that the weight 89 may be moved along the slot 88 for the purpose of weight adjustment. A spring 93 is tensioned between a tab 91 on the arm 77 and a pin 92 fixed to the bracket 70 to press the roller 76 downwardly against the rotating cylinder 26 with a suitable force to cause rotation of the roller 76 by frictional engagement with the cylinder 26. However it is so arranged that the rotational axis of the roller 76 lies in a direction at right angles with respect to a dot-dash line E in FIG. 1 connecting the needle 20 and the axis D of horizontal pivotal movement of the tone arm 21. It will be understood that the tone arm 21, the brackets 24 and 70, the arm 77 and the roller 76 can thus unitarily make pivotal movement about the dot-dash line D. These members will be resisted, during their pivotal movement, by the friction between the steel balls 73, 74 and the step bearings 64, 71, 72 and the screw 66, and the friction between the roller 76 and the cylinder 26. The former friction can be reduced by the use of a hard material such as steel for the step bearings 64, 71, 72 and the screw 66. The latter friction can be limited to rolling friction alone by positioning the contact point between the roller 76 and the rotating cylinder 26 on the dot-dash line D and by thus minimizing the resistance encountered during their rotation. Therefore, the tone arm 21 can make smooth pivotal movement in the horizontal plane.

Since the balance weight 89 is suitably adjusted so that the weight of the tone arm 21, the counterweight 25, the brackets 24 and 70, the arm 77 and the roller 76 is balanced about the dot-dash line D, any undesirable side pressure would not be imparted to the needle 20 even when the chassis 27 may be supported in inclined relation.

When, with the device of this invention having the structure as described above, the needle 20 placed on the record 42 travels along the record groove to a position 20*a* as shown in FIG. 1, the tone arm 20 is inclined and the dot-dash line E connecting the needle 20 with the axis D of horizontal pivotal movement of the tone arm 21 will now take a position as shown by a dot-dash line F. This will cause inclination of the rotational axis of the roller 76 with respect to the rotational axis of the cylinder 26. Since the cylinder 26 is rotating in the direction of arrow A in FIG. 2, a component of rotating force of the cylinder 26 is imparted to the roller 76 in a direction of arrow B. As a result, the carriage 53 is urged in the same direction or direction of arrow B along the guide bars 62 and 63 until finally the dot-dash line F comes to join a dot-dash line G which is at right angles with respect to the rotational axis of the cylinder 26. In other words, the carriage 53 ceases its movement when the tone arm 21 moves to a position 21*a* as shown. At this position of the tone arm 21, the rotational axis of the roller 76 is in parallel with that of the cylinder 26 as shown in FIG. 5.

As the needle 20 is gradually and continuously fed along the spiral record groove during playing of the record, the carriage 53 also makes gradual and continuous movement in the direction of arrow B in such manner that the dot-dash line E connecting between the needle 20 and the axis D of the horizontal pivotal movement of the tone arm 21 is constantly maintained at right angles with respect to the rotational axis of the cylinder 26, the needle 20 describing a track as shown by a radial line P without causing any tracking errors. Since further the carriage 53 is moved by a force other than the pressure imparted to the needle 20 by the lead of the spiral record groove, that is, the force derived from the rotation of the rotating cylinder 26, it will be appreciated that the phonograph tone arm 21 of the structure as described above is ideal in that the needle 20 thereof is almost free from any of the inside and outside forces. The device according to the invention is applicable to phonograph record players employing a high-grade phonograph tone arm with a light vertical force on its needle of the order of only one gram.

Figure 6:
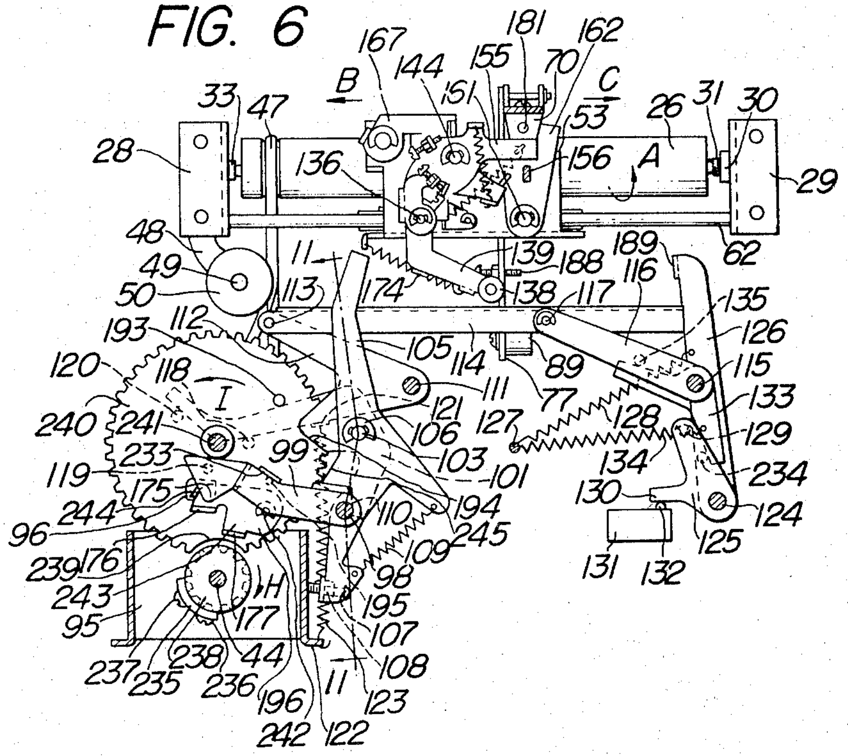
FIG. 6 is a cross-sectional view taken along the line 6—6 in FIG. 2.
Figures 11, 12, 13:
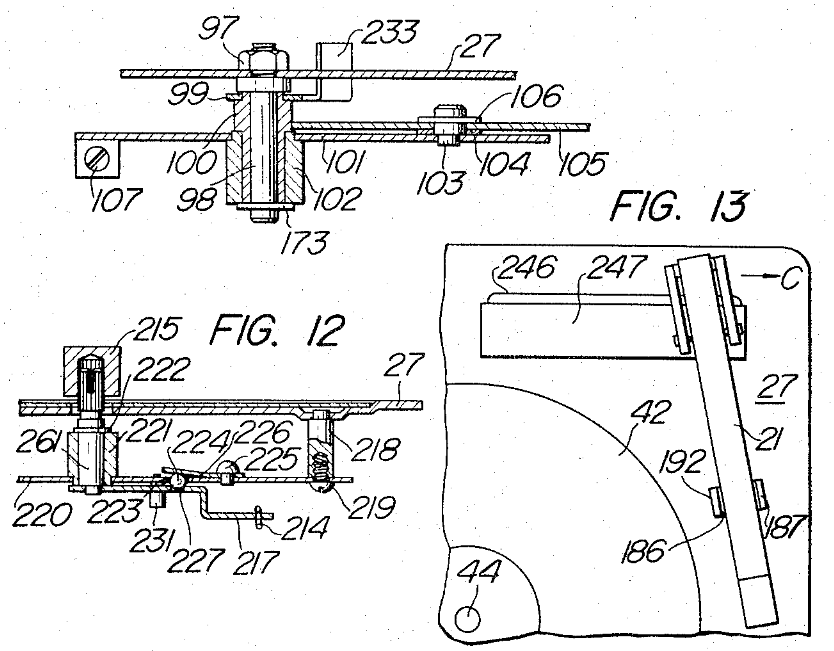
FIG. 11 is an enlarged cross-sectional view taken along the line 11—11 in FIG. 6.
FIG. 12 is an enlarged cross-sectional view taken along the line 12—12 in FIG. 9.
FIG. 13 is a plan view of part of the device of the invention showing the tone arm returned to its rest position.

In FIG. 6, a gear 238 of small diameter having a claw plate 235 fixed thereto by screws 236 and 237 is firmly secured on the spindle 44 and is rotated in a direction of arrow H as the turntable 43 rotates. A gear 240 of large diameter having a cutout 239 at a portion of its periphery is rotatably mounted on a shaft 241 fixed to the chassis 27, and a clutch lever 243 is pivotally mounted on a pin 242 fixed to the gear 240. The clutch lever 243 is provided with an ear 244 which is inserted in a square opening 96 of the gear 240 to limit the rotation of the clutch lever 243. As shown in FIGS. 6 and 11, a shaft 98 is securely fixed to the chassis 27 by a nut 97 and a boss 100 having a friction lever 99 secured thereto is rotatably mounted on the shaft 98 by a half-moon retainer 173. On the boss 100, there is rotatably mounted a boss 102 to which an arm 101 is securely fixed. A pin 103 is fixedly mounted at one end of the arm 101, and a detection lever 105 is pivotally mounted on the pin 103 by a half-moon retainer 106, with a spacer 104 interposed between the arm 101 and the lever 105. On the other end of the arm 101, an adjustable screw 107 is mounted and set in position by a nut 108. A spring 109 is tensioned between the detection lever 105 and the arm 101 so as to normally urge an end face 110 of the detection lever 105 against the boss 100 of the friction lever 99 with a suitable pressure. Therefore the arm 101 and the detection lever 105 are normally unitarily rotatable about the shaft 98.

In FIG. 6, a follower lever 112 is pivotally mounted on a shaft 111 fixed to the sub-chassis 94 and has at one end thereof pivoted to one end of a link 114 by a pivot pin 113. The other end of the link 114 is pivotally mounted on a pin 117 of a lever 116 which is pivotally mounted on a shaft 115 fixed to the sub-chassis 94. These members conjointly form a parallel motion mechanism. Or more precisely, as the gear 240 rotates in a direction of arrow I, pins 118, 119 and 120 fixed thereto urge the follower lever 112 to rotate about the shaft 111 and the link 114 makes reciprocating movement towards and away from the cylinder 26 in parallel to the rotational axis of the cylinder 26. A spring 123 is tensioned between an ear 121 on the follower lever 112 and a bent portion 122 of the U-shaped bracket 95 to impart a force of counter-clockwise rotation to the follower lever 112 so that the follower lever 112 is forced between the pins 118 and 120 on the gear 240, which is thereby kept in its stable state. Since in this state of the gear 240 its cutout 239 is disposed opposite the meshing portion of the gear 238 of small diameter, the gear 240 of large diameter is held from movement even when the gear 238 of small diameter is rotating.

A switch control lever 125 and a rest switch lever 126 are pivotally mounted on a shaft 124 secured to the sub-chassis 94, and a spring 128 is tensioned between the rest switch lever 126 and a pin 127 fixed on the sub-chassis 94 to impart a force of counter-clockwise rotation to the lever 126. This counter-clockwise rotation of the rest switch lever 126 urges a pin 129 fixed to the switch control lever 125 so that an actuating arm 130 of the switch control lever 125 depresses a push button 132 of a microswitch 131 to turn on the power supply to the driving motor for the turntable 43. Pivotally mounted on the shaft 115 is a lever 133 which is pivotal independently of the lever 116 and which is normally urged in the clockwise direction by a spring 134 tensioned between it and the pin 127. The pivotal movement of the lever 133 is limited by a pin 135 fixed to the lever 116.

Figure 7:
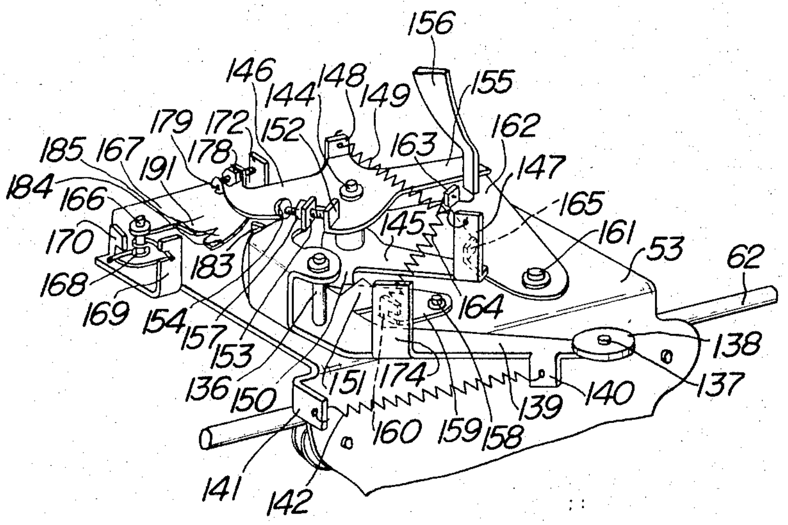
FIG. 7 is a perspective view of a tone arm operating mechanism for automatically urging the tone arm mounted on a carriage to its rest position.
Figure 8:
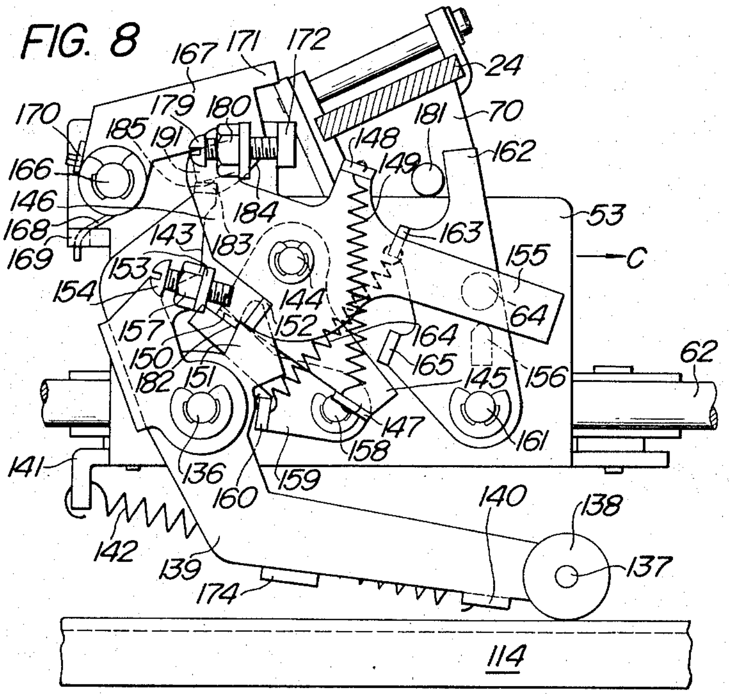
FIG. 8 is an enlarged plan view of the tone arm operating mechanism of FIG. 7, the mechanism being shown in the course of operation of automatically returning the tone arm mounted on the carriage to its rest position.

Referring to FIGS. 7 and 8, an actuating lever 139 is pivotally mounted on a shaft 136 fixed to the carriage 53 and has at one end thereof rotatably mounted a roller 138 by a pin 137. The actuating lever 139 is normally urged in the clockwise direction by a spring 142 tensioned between an ear 140 of the lever 139 and an ear 141 of the carriage 53 and one end 143 of the actuating lever 139 is normally abutted by a shaft 144 secured to the carriage 53 so that the clockwise rotation of the lever 139 is restricted. A lever 145 and a tone arm up-down lever 146 are pivotally mounted on the shaft 144 so as to be rotatable independently of each other. A spring 149 is tensioned between an ear 147 of the lever 145 and an ear 148 of the tone arm up-down lever 146. The counter-clockwise rotation of the lever 145 by the spring 149 is restricted by abutment of an ear 150 of the lever 145 with an extension 151 of the actuating lever 139, while the clockwise rotation of the tone arm up-down lever 146 by the spring 149 is normally restricted by abutment of an ear 152 of the lever 146 with an adjustable screw 154 fitted on an ear 153 of the actuating lever 139. The adjustable screw 154 is suitably adjusted and set in position by a nut 157 so that the leg 155 of the tone arm up-down lever 146 may not contact a tail 156 fixed integrally with the counterweight 25 secured to the tone arm 21 in FIG. 2 during the reproduction of the record. A clamp lever 159 is pivotally mounted on a pin 158 fixed on the carriage 53, and a spring 164 is tensioned between an ear 160 of the clamp lever 159 and an ear 163 of a tone arm actuating lever 162 which is pivotally mounted on a pin 161 fixed to the carriage 53. During reproduction of the record, the clockwise rotation of the clamp lever 159 by the spring 164 is restricted by abutment of the ear 160 of the clamp lever 159 with the extension 151 of the actuating lever 139, while the counter-clockwise rotation of the tone arm actuating lever 162 by the spring 164 is also restricted by abutment of its ear 165 with the lever 145. A clamp lever 167 for clamping the actuating lever 139 is pivotally mounted on a shaft 166 fixed to the carriage 53. A torsion and compression spring 168 has one end hooked on an extension 169 of the carriage 53 and the other end hooked on an ear 170 of the clamp lever 167 to normally urge the clamp lever 167 downwardly and to impart a force of clockwise rotation thereto. The clamp lever 167 is restricted from clockwise rotation by abutment of its extension 171 with a stop 172 provided on the carriage 53.

As the needle 20 is gradually fed along the spiral record groove during the reproduction of the record, the carriage 53 is also gradually urged in the direction B in FIG. 6. When the needle 20 is led near the innermost groove portion of the spiral record groove, a lateral extension 174 of the actuating lever 139 provided on the carriage 53 abuts the detection lever 105 and urges the same so that the detection lever 105 and the arm 101 are conjointly gradually rotated about the shaft 98 in the counter-clockwise direction. Then the friction between the boss 102 of the arm 101 and the boss 100 of the friction lever 99 in FIG. 11 causes gradual counter-clockwise rotation of the friction lever 99 about the shaft 98, with the result that an extension 175 of the friction lever 99 urges an ear 176 of the clutch lever 243 to cause counter-clockwise rotation of the clutch lever 243 about the pin 242. As the clutch lever 243 is successfully rotated counter-clockwise, another ear 177 of the clutch lever 243 will be moved towards a position at which it is contacted by the claw plate 235 rotating with the spindle 44 in the direction of arrow H. Since however the needle 20 will be fed only at a slight rate while the needle 20 is tracing the modulated groove of the record, and the clutch lever 243 will also be rotated only at a slight rate, the ear 177 is kicked back in the clockwise direction by the claw plate 235.

The needle 20 is fed at a high rate when it is finally guided into the innermost lead-out groove of large pitch from the modulated groove, and the rate of movement of the carriage 53 in the direction of arrow B will become correspondingly high, causing quick rotation of the detection lever 105, the arm 101 and the friction lever 99, hence a great degree of rotation of the clutch lever 243. This causes collision of the ear 177 of the lever 243 with the claw plate 235 and the gear 240 of large diameter is slightly rotated in the direction of arrow I with the rotation of the claw plate 235 in the direction of arrow H. Therefore the gear 240 of large diameter is brought into meshing engagement with the gear 238 of small diameter and thereafter is continuously rotated in the direction of arrow I with the rotation of the gear 238 in the direction of arrow H. The rotation of the gear 240 causes the pin 118 fixed thereto to urge the follower lever 112, which is thereby rotated clockwise about the shaft 111 to cause the parallel motion of the link 114 towards the carriage 53. Therefore, the link 114 urges the roller 138 of the actuating lever 139 in FIGS. 7 and 8 to cause the actuating lever 139 to rotate counter-clockwise about the shaft 136. As a result, the screw 154 fixedly mounted on the actuating lever 139 moves away from the ear 152 of the tone arm up-down lever 146, which lever therefore is rotated clockwise about the shaft 144 by the force of the spring 164 until a screw 179 fixedly mounted in another ear 178 is abutted by the stop 172 provided on the carriage 53. This rotation of the tone arm up-down lever 146 causes its leg 155 to urge the tail 156 fixed to the tone arm 21 to thereby rotate the tone arms 21 clockwise in FIG. 2 about the horizontal pivots 22 and 23 so that the needle 20 is moved upwardly away from the record 42.

The screw 179 fixed on the tone arm up-down lever 146 is suitably adjusted and set in position by a nut 180 in order that the needle 20 can be spaced a suitable vertical distance from the upper face of the record 42.

On the other hand, with the counter-clockwise rotation of the actuating lever 139, its extension 151 urges the ear 150 of the lever 145 to rotate the same clockwise about the shaft 144, with the result that the tone arm actuating lever 162 is rotated counter-clockwise about the shaft 161 by the force of the spring 164. When the needle 20 takes its uppermost position at which it is spaced the greatest distance from the record 42, the tone arm actuating lever 162 urges a pin 181 fixed to the bracket 70 to rotate the bracket 70 counter-clockwise about the dot-dash line D in FIG. 2 until the pin 181 abuts the carriage 53. By this operation, the pickup 19 on the tone arm 21 is moved towards the edge of the record 42.

As the clockwise rotation of the lever 145 proceeds, its ear 150 is clamped in a cutout 182 of the clamp lever 159 which tends to rotate clockwise about the shaft 158 by being urged by the spring 164 because the extension 151 of the actuating lever 139 is now urged away from the ear 160. On the other hand, with the counter-clockwise rotation of the actuating lever 139, its lateral extension 183 urges a slanted edge 184 of the clamp lever 167 to rotate the latter counter-clockwise about the shaft 166 against the torsion exerted by the spring 168. When the follower lever 112 is rotated clockwise in FIG. 6 to a greatest degree about the shaft 111 by the pin 118 fixed to the gear 240 of large diameter, the lateral extension 183 of the actuating lever 139 is clamped in a cutout 185 of the clamp lever 167 as shown in FIG. 8.

When the gear 240 of large diameter makes further rotation in the direction of arrow I in FIG. 6 from the state as shown, the pin 118 moves away from the follow lever 112, which therefore starts to rotate in the reverse direction or counter-clockwise so that the link 114 makes parallel motion in a direction away from the carriage 53 and is disengaged from the roller 138 because the actuating lever 139 is left clamped by the clamp lever 167. Since the bracket 70 has already been forcedly rotated counter-clockwise in FIG. 8 as described previously, the rotational axis of the roller 76 is inclined with respect to the rotational axis of the cylinder 26 and a component of rotating force is imparted from the rotating cylinder 26 to the roller 76 in the direction of arrow C, with the result that the carriage 53 is also urged in the same direction and the tone arm 21 is moved to a position outside of the record 42.

Referring to FIG. 13, as the carriage 53 moves in the direction of arrow C, the tone arm 21 is abutted by a stop side 187 of a rest 186 fixed on the chassis 27 and the inclination of the tone arm 21 is thereby gradually rectified with the gradual movement of the carriage 53. In the meantime, an adjustable screw 188 provided on the arm 77 supporting the roller 76 is abutted by an ear 189 of the rest switch lever 126 in FIGS. 2 and 6 to cause clockwise rotation of the lever 126 about the shaft 124. Therefore the switch control lever 125 whose clockwise rotation has been restricted by the abutment of its pin 129 with the rest switch lever 126 is now free to make clockwise rotation about the shaft 124, but at this time the lever 116 is yet kept at a position at which it is more rotated clockwise about the shaft 115 than the state as shown in FIG. 6. Since at this position of the lever 116 its pin 135 does not abut the lever 133, which therefore is rotated clockwise about the shaft 115 to urge a pin 234 fixed to the switch control lever 125, the switch control lever 125 is rotated counter-clockwise about the shaft 124 and its actuating arm 130 depresses the push button 132 of the micro-switch 131, keeping the power supply for the turntable driving motor in its "on" state.

The pin 119 fixed on the gear 240 of large diameter at a position closer towards the shaft 241 than the pin 118 is provided for the purpose of restricting the counter-clockwise rotation of the follower lever 112 so that the pin 135 on the lever 116 may not rotate the lever 133 counter-clockwise about the shaft 115 until such time is reached at which the pin 118 moves away from the follower lever 112 with the rotation of the gear 240, the follower lever 112 then rotates counter-clockwise about the shaft 111 and thereafter the pin 120 disposed at a position remoter from the shaft 241 than the pin 118 abuts the follower lever 112.

As the rotation of the gear 240 of large diameter in the direction of arrow I proceeds and the pin 120 abuts the follower lever 112 to again rotate the lever 112 about the shaft 111 in the clockwise direction in FIG. 6, the link 114 makes its parallel motion towards the carriage 53 and finally contacts the roller 138 of the actuating lever 139 as shown in FIG. 8. Since the pin 120 fixed to the gear 240 is disposed at the position remoter from the center of the shaft 241 than the pin 118, the link 114 is moved further closer towards the carriage 53 than the state as shown in FIG. 8 to cause the actuating lever 139 to further rotate counter-clockwise about the shaft 136. Therefore the lateral extension 183 of the actuating lever 139 is disengaged from the cutout 185 of the clamp lever 167 and the lever 167 is then rotated clockwise about the shaft 166 by the torsion of the spring 168 until its extension 171 is abutted by the stop 172 of the carriage 53.

As the pin 120 moves away from the follower lever 112 with the rotation of the gear 240 in the direction of arrow I, the follower lever 112 is now rotated in the reverse direction or counter-clockwise about the shaft 111 and the link 114 makes its parallel motion in the direction away from the carriage 53. Therefore in FIG. 8 the actuating lever 139 starts to rotate clockwise about the shaft 136 by the force of the spring 142 and its lateral extension 183 passes below a tongue 191 provided along the upper part of the clamp lever 167 against the compression of the spring 168. The lever 145 is held in its clamped state in the clamp lever 159 regardless of slight clockwise rotation of the actuating lever 139. When the actuating lever 139 makes its clockwise rotation about the shaft 136, the screw 154 fixed thereon abuts the ear 152 of the tone arm up-down lever 146 to urge the lever 146 counter-clockwise about the shaft 144, with the result that the leg 155 of the tone arm up-down lever 146 is moved away from the tail 156 of the tone arm 21 and the tone arm 21 therefore rotates about the horizontal pivots 22 and 23 to move downwardly on the rest 186. Thereafter the actuating lever 139 rotates clockwise about the shaft 136 and its extension 151 urges the ear 160 of the clamp lever 159 to rotate the lever 159 counter-clockwise about the shaft 158, with the result that the cutout 182 of the lever 159 is released from the clamping engagement with the ear 150 of the lever 145. The lever 145 is therefore rotated counter-clockwise about the shaft 144 by the force of the spring 149, and strikes against the ear 165 of the tone arm actuating lever 162 to urge the latter clockwise about the shaft 161 so that the bracket 70 is now free to rotate clockwise. In this situation, the tone arm 21 is merely restricted from rotation by being held between the stop side 187 and the clamp side 192 of the rest 186. The tone arm 21 therefore can be lifted by hand and freely rotated in the direction in which the record 42 is placed.

After the lateral extension 183 of the actuating lever 139 has passed below the clamp lever 167, the clamp lever 167 is urged downwardly by the compression of the spring 168. The actuating lever 139 ceases its rotation when its edge 143 is abutted by the shaft 144.

When in FIG. 6 the gear 240 of large diameter nearly completes its one rotation, a pin 193 fixed thereto urges an extension 194 of the arm 101, which has been rotated counter-clockwise about the shaft 98, to cause the arm 101 to rotate clockwise until the screw 107 fixed thereon is abutted by the U-shaped bracket 95. Another pin 195 fixed to the gear 240 urges the extension 175 of the friction lever 99 to rotate the lever 99 clockwise about the shaft 98. The clutch lever 243 pivotally mounted on the gear 240 is rotated clockwise about its pivot pin 242 as its extension 196 is abutted by the outer periphery of the gear 238 of small diameter with the rotation of the gear 240 in the direction of arrow I. The moment the cutout 239 of the gear 240 is opposed by the meshing portion of the gear 238, the follower lever 112 is urged between the pins 118 and 120 on the gear 240 by the force of the spring 123 to stop the rotation of the gear 240. The above completes the automatic returning operation of the tone arm 21 to its rest position. Meanwhile, the lever 116 has been rotated counter-clockwise about the shaft 115 until it takes the position as shown in FIG. 6 and the pin 135 of the lever 116 urges the lever 133 to rotate the latter counter-clockwise so that the switch control lever 125 is now free to rotate. Therefore the push button 132 of the micro-switch 131 jumps outwardly by its own resiliency with the result that the micro-switch 131 is turned off to cut off the power supply to the motor so that the turntable 43 ceases its rotation.

Next description will be directed to the means for making operation of returning the tone arm 21 from any intermediate position during reproduction of the record to its rest position and an automatic-manual change-over mechanism which prevents the automatic return of the tone arm 21 even when quick feed is applied to the needle 20 by the lead-out groove of the record 42 at the end of reproduction of the record.

Figure 9:
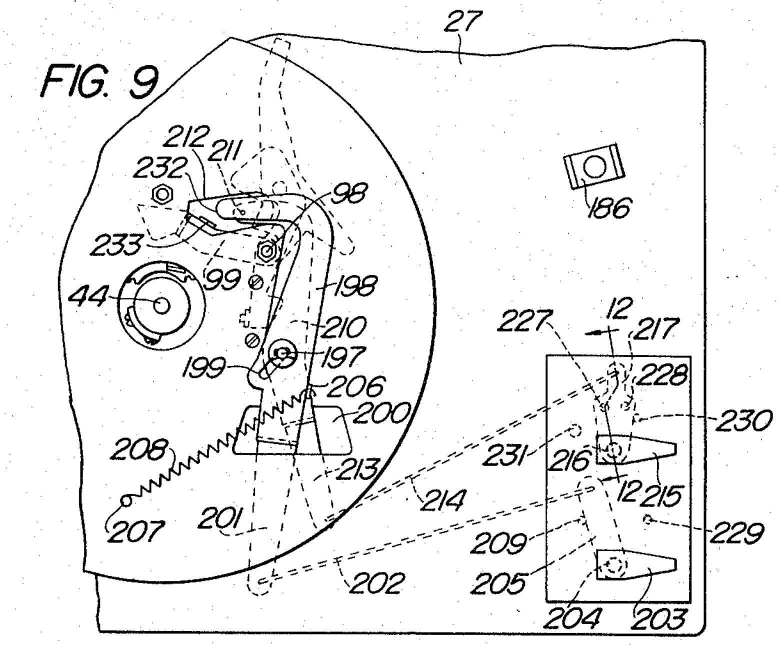
FIG. 9 is a plan view of part of the device of the invention with the turntable removed to show internal structure of the device.

In FIG. 9, a shaft 197 is fixed on that surface of the chassis 27 at which the turntable 43 is placed. The shaft 197 extends through a slot 199 of a cut lever 198 to pivotally support the lever 198 thereon and the lever 198 has its leg 201 extended downwardly through an opening 200 of the chassis 27. A rod 202 is connected at one end to the end of the leg 201 and at the other end to a lever 205 fixedly mounted on a shaft 204 of a knob 203. A spring 208 is tensioned between an ear 206 of the cut lever 198 and a pin 207 fixed on the chassis 27 to normally urge the cut lever 198 clockwise about the shaft 197. A stop pin 209 abuts the lever 205 to restrict the rotation of the lever 198. A change lever 210 is pivotally mounted on the shaft 197 and has a pin 211 fixed on one end thereof which extends downwardly through an opennig 212 of the chassis 27. The change lever 210 has a leg 213 extended downwardly through the opening 200 of the chassis 27, and a rod 214 is connected at one end with the end of the leg 213 and at the other end with a lever 217 fixedly mounted on a shaft 216 of a knob 215 as shown in FIGS. 9 and 12. A plate 220 is fixed by screws 219 to a plurality of poles 218 secured to the chassis 27. A boss 221 fixed to the plate 220 is mounted for rotation on the shaft 216 and is set by a half-moon retainer 222. A hole 223 is bored in the plate 220 to receive therein a ball 224, which is urged downwardly by a leaf spring 226 fixed to the plate 220 to be pressed into either of holes 227 and 228 provided on the lever 217 to set the lever 217 in position, the latter holes having a diameter slightly smaller than that of the ball 224. Stop pins 209, 229, 230 and 231 are fixed on the plate 220.

In FIG. 9, the knob 203 may be rotated clockwise until the stop pin 229 is abutted by the lever 205 at whatever position of the tone arm 21 on the record 42 during the record reproduction. By this manipulation of the knob 203, the rod 202 is pulled to cause the counter-clockwise rotation of the cut lever 198 about the shaft 197, with the result that the tip portion 232 of the lever 198 urges a lateral extension 233 of the friction lever 99 protruding through the opening 212 of the chassis 27 to cause counterclockwise rotation of the friction lever 99 about the shaft 98. Therefore in FIG. 6 the extension 175 of the lever 99 urges the ear 176 of the clutch lever 243 to cause counterclockwise rotation of the latter about its pivot pin 242. This results in the meshing engagement between the gears 238 and 240 so that the automatic mechanism for returning the tone arm 21 to its rest position becomes operative. It is to be understood that according to this invention the automatic mechanism can be placed in operation regardless of the position of the carriage 53 since the link 114 for driving the actuating lever 139 pivotally mounted on the carriage 53 is disposed in parallel with the cylinder 26.

When it is desired to operate the device according to the present invention as a manual record player, the knob 215 may be rotated counter-clockwise in FIG. 9. This causes rotation of the lever 217 until it is abutted by the stop pin 231. At this position, the ball 224 is pressed into the hole 228 of the lever 217, which is thereby held in position. The rod 214 is now pushed to cause the change lever 210 to rotate clockwise about the shaft 197, and the pin 211 on the lever 210 urges an end face 245 of the detection lever 105 to cause the latter to rotate counter-clockwise about the pin 103 against the force of the spring 109. The force of the pin 211 urging the end face 245 of the detection lever 105 imparts a rotating force to the arm 101, which therefore rotates clockwise about the shaft 98 with the result that the screw 107 thereon is pressed against the U-shaped bracket 95. Under this state, in FIG. 10, the mechanism for automatically returning the tone arm 21 to its rest position is inoperative because the detection lever 105 has been rotated to a great degree in the counter-clockwise direction about the pin 103 as described above and therefore the lateral extension 174 of the actuating lever 139 is not in abutment with the detection lever 105 even if the carriage 53 is moved in the direction of arrow B to the utmost extent that it abuts the side plate 28. Even in this case, the tone arm 21 can be automatically returned from any intermediate position on the record to its rest position by merely rotating the knob 203 clockwise in FIG. 9 to cause the tip portion 232 of the cut lever 198 to urge the lateral extension 233 of the friction lever 99.

From the foregoing detailed description, it will be understood that the present invention has many excellent features over prior phonograph devices.

One feature of the invention resides in its unique mechanism for automatically, smoothly and positively returning the tone arm 21 to its rest position. The automatic returning mechanism is placed in operation as soon as quick feed is applied to the needle 20 by the lead-out groove of a record at the completion of reproduction of the record, then causes the rotation of the tone arm 21 in a direction in which the needle 20 is lifted away from the record 42, and subsequently operates to forcedly tilt the axis of the roller 76 with respect to the axis of the rotating cylinder 26 to insure smooth return of the tone arm 21 to its rest position.

According to another feature of the invention, the force for moving the carriage 53 in the direction B in FIG. 6 resulting from a component of rotating force imparted to the roller 76 by the rotating cylinder 26 is utilized to start the operation of the mechanism for automatically returning the tone arm 21 to its rest position when the needle 20 is subjected to quick feed due to the lead-out groove of a record. Or more precisely, such force for moving the carriage 53 is utilized so that the lateral extension 174 of the actuating lever 139 pivotally mounted on the carriage 53 can cause counter-clockwise rotation of the detection lever 105 about the shaft 98 in FIG. 6 to thereby effect meshing engagement between the gear 238 of small diameter and the gear 240 of large diameter. By virtue of the above arrangement, the needle 20 is quite free from any undesirable side pressure and it is possible to attain automatic operation of the tone arm employing the phonograph pickup having a light vertical force on the needle of the order of only one gram, which could not be realized with a prior record player having an automatic mechanism adapted to be placed in operation by a force of feed imparted to the needle by the spiral record groove.

Still another feature of the invention resides in that the micro-switch 131 for controlling the power supply to the motor can positively be turned off even with the tone arm having a needle to which a light vertical force of, for example, only one gram is applied. Or more precisely, the tone arm 21 at its rest position makes a slight angle with respect to the axis of the cylinder 26 as shown in FIG. 13 and therefore the axis of the roller 76 is also at angle with respect to the axis of the cylinder 26, with the result that a component of rotating force of the cylinder 26 is imparted to the carriage 53 in the direction of arrow C. This force causes the screw 188 provided on the arm 77 to urge the ear 189 of the rest switch lever 126 in FIG. 6 whereby the micro-switch 131 can positively be driven to its off position.

According to a further feature of the invention there is no possibility that the gear 238 of small diameter and the gear 240 of large diameter are brought to stoppage under their engaged state even when the automatic return mechanism is actuated to bring the tone arm 21 prematurely to its rest position while the gear 238 is in meshing engagement with the gear 240. Suppose now that the automatic return mechanism is actuated to cause premature return of the tone arm 21 to its rest position so that the rest switch lever 126 is rotated clockwise about the shaft 124 in FIG. 6 while the gears 238 and 240 are still in their meshing engagement. Even in such a case, the micro-switch 131 would remain in its "on" state, because the lever 116 has been rotated clockwise about the shaft 115 and the lever 133 has been rotated clockwise by the force of the spring 134 with the result that the lever 133 urges a pin 234 fixed on the switch control lever 125 to cause the lever 125 to rotate counter-clockwise about the shaft 124. Therefore there is utterly no possibility that the motor ceases its rotation and the gears 238 and 240 are brought to stoppage under their engaged state. Subsequent reproduction of the record is possible even from the "off" state of the micro-switch 131 at the completion of one cycle of the automatic return mechanism for the tone arm 21. This is easily effected by merely gripping the tone arm 21 by hand and bringing it towards the record from the rest 186. This causes rotation of the rest switch lever 126 in the counter-clockwise direction about the shaft 124 by the force of the spring 128, the lever 126 in turn urging the pin 129 of the switch control lever 125 to cause counter-clockwise rotation of the lever 125 so that the micro-switch 131 is turned on to drive the motor, hence the turntable.

A still further feature of the invention resides in that a mechanism for inclining the axis of the roller 76 with respect to the axis of the cylinder 26 is provided on the carriage 53 to effect automatic returning of the tone arm 21 to its rest position. Or more lift the needle 20 away from the record 42 and then to urge the pin 181 fixed to the bracket 70 to incline the axis of the roller 76 with respect to the axis of the cyinder 26. Further the link 114 for the actuation of the mechanism is provided in parallel with the rotational axis of the cylinder 26. By virtue of this arrangement, the roller 138 on the actuating lever 139 pivotally mounted on the carriage 53 can be brought into rolling contact with the link 114 at whatever position of the tone arm 21. Therefore by turning the knob 203, it is possible to effect antomatic return of the tone arm 21 to its rest position from any intermediate position thereof.

According to another feature of the invention, extremely smooth transfer of the tone arm 21 towards its rest position is insured by virture of the following arrangement. Or more precisely, the actuating lever 139 is once clamped by the clamp lever 167 when the link 114 first makes its parallel motion towards the carriage 53 in FIG. 6. Then during a period in which the link 114 moves temporarily away from the carriage 53, there is no contact between the roller 138 on the actuating lever 139 and the link 114, with the result that no friction exists between the roller 138 and the link 114 when the carriage 53 is moved in the direction of arrow C by the component of rotating force imparted to the roller 76 from the cylinder 26, and friction exists only between the guide rollers 58, 59, 60 and 61 and the guide bars 62 and 63. Therefore by suitably arranging the mechanism shown in FIG. 2 in a manner that the force of the spring 93 tensioned between the arm 77 and the bracket 70 to press the roller 76 onto the cylinder 26 becomes substantially equal to the total weight of the tone arm 21, the counterweight 25, the brackets 24 and 70, the arm 77, the balance weight 89, the roller 76 and the carriage 53, there is substantially no force applied between the guide rollers 58, 59, 60 and 61 and the guide bars 62 and 63, and frictional resistance is thereby greatly reduced. Thus, the tone arm 21 can smoothly be transferred to its rest position.

A further feature of the invention resides in the provision of three pins 118, 119 and 120 fixed on the gear 240 of large diameter as shown in FIG. 6 in order that these pins urge the follower lever 112 in a manner to cause the parallel motion of the link 114. This arrangement eliminates complex cam means hitherto employed in conventional automatic record players and the like. This arrangement is also advantageous in that the gear 240 of large diameter and the gear 238 of small diameter are brought to their stable state with the cutout of the former disposed opposite the meshing portion of the latter when the follower lever 112 is forced between the pins 118 and 120 on the gear 240, so that there is no fear that the gear 240 makes overrun after its one turn to again mesh with the gear 238.

According to a still further feature of the invention, the spring 109 is provided between the arm 101 and the detection lever 105 pivotally mounted thereon, and the end face 110 of the detection lever 105 is pressed against the boss 100 of the friction lever 99 as shown in FIGS. 6 and 11 in order to set up a suitable frictional relation between the boss 102 of the arm 101 and the boss 100 of the friction lever 99. If this friction is too little, erroneous operation of the automatic return mechanism may result, because the friction lever 99 may be urged more than required due to shock produced when the clutch lever 243 is kicked back by the claw plate 235 fixed to the gear 238 and the automatic returning mechanism may not properly detect and operate in response to the quick feed applied to the tone arm 21. If this friction is too much, great impact will be imparted to the clutch lever 243 when it is kicked back by the claw plate 235 fixed to the gear 238 and this impact will be transmitted through the detection lever 105 and the carriage 53 to the tone arm 21, thus adversely affecting the reproduced sound of the record. As described above, it is necessary to set the friction at a suitable value by suitably selecting the tension of the spring 109.

Figure 10:
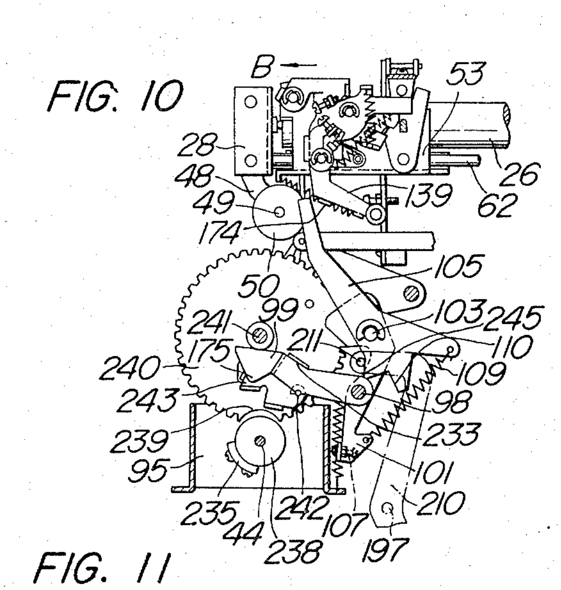
FIG. 10 is a partial cross-sectional view similar to FIG. 6 but showing the device of the invention changed over to a position in which the device can be manipulated solely by manual means.

Another feature of the invention resides in that any excessive force is not imparted to the mechanism at whatever position the tone arm 21 is when the change-over knob 215 is manipulated for the automatic-manual change-over. Suppose for example that the knob 215 is turned to rotate the change lever 210 clockwise about the shaft 197 as shown in FIG. 10 to change over the record player to its position of manual operation under a state in which the tone arm 21 is gradually fed by the spiral record groove, the carriage 53 is gradually moved in the direction of arrow B in FIG. 6, the lateral extension 174 of the actuating lever 139 urges the detection lever 105 and as a result the clutch lever 243 is kicked back by the claw plate 235 fixed to the gear 238 as described above. In this case, the pin 211 of the change lever 210 urges the end face 245 of the detection lever 105 to rotate the lever 105 further counter-clockwise about the pin 103, and at th same time the force of the pin 211 urging the end face 245 of the detection lever 105 urges the arm 101 clockwise about the shaft 98 until the screw 107 fixed thereon is abutted by the U-shaped bracket 95, which arm 101 has up to then been gradually rotating counter-clockwise with the movement of the carriage 53 in the direction of arrow B. Since a force of friction is imparted to the friction lever 99, the clutch lever 243 would not be rotated in its counter-clockwise direction. The device can thus be changed over to its manually operative position with the mechanism for automatically returning the tone arm 21 to its rest position driven to its inoperative state. The changeover from the manually operative state to the automatically operative state will unobstructedly be effected as long as the tone arm 21 is disposed at a position at which the lateral extension 174 of the actuating lever 139 pivotally mounted on the carriage 53 as shown in FIG. 6 can not abut the detection lever 105. However, when the change lever 210 is rotated counter-clockwise about the shaft 197 from a state in which the tone arm 21 has moved to a position near the innermost portion of the record groove and the detection lever 105 takes the position as shown in FIG. 10, the pin 211 on the change lever 210 moves away from the end face 245 of the detection lever 105 and the lever 105 is rotated clockwise about the pin 103 by the force of the spring 109. In the course of the rotation, the lever 105 is restricted from rotation by being abutted by the lateral extension 174 of the actuating lever 139 and the arm 101 is rotated counter-clockwise about the shaft 98 by the force of the spring 109 until the end face 110 of the detection lever 105 abuts the boss 100 of the friction lever 99. As a result, the friction lever 99 is also rotated counter-clockwise about the shaft 98 to urge the clutch lever 243 counter-clockwise about the pin 242 so that the gear 240 is brought into meshing engagement with the gear 238 to place the automatic mechanism in operation. In other words, the tone arm 21 may undesirably make its automatic returning movement to its rest position when the knob 215 is turned clockwise to change over the record player from its manually operative state to its automatically operative state when the needle 20 on the tone arm 21 is positioned near the innermost portion of the spiral record groove. Even in such a case, the entire mechanism of the record player according to the invention is quite free from any objectionable force and there is utterly no possibility that undesirable side pressure is applied to the needle during the change-over from the manual to automatic operation as has been frequently the case with prior record players.

A further feature of the invention resides in the provision of safety means to prevent the automatic mechanism from being damaged to to erroneous manipulation. Suppose now that the tone arm 21 is gripped by hand to obstruct the movement of the carriage 53 in the direction of arrow B under a state in which quick feed is imparted to the tone arm 21 by the lead-out groove of the record 42 with the result that the detection lever 105 is greatly rotated counter-clockwise in FIG. 6 by the lateral extension 174 of the actuating lever 139 pivoted to the carriage 53 and the automatic mechanism is thereby placed in operation to start the rotation of the gear 240 of large diameter. In this case even though the pin 193 fixed on the gear 240 urges the extension 194 of the arm 101 to cause the arm 101, which has been rotated counter-clockwise about the shaft 98, to rotate now clockwise, the detection lever 105 is still abutted by the lateral extension 174 of the actuating lever 139 and therefore is rotated counter-clockwise about the pin 103 fixed on the arm 101 as the pin 103 is rotated clockwise about the shaft 98. As a result of the above operation, the spring 109 will be stretched to absorb any excessive force that may be imparted to the detection lever 105. When it is desired to cause automatic return of the tone arm 21 during reproduction of the record, the knob 203 in FIG. 9 may temporarily be turned clockwise to start the operation of the automatic mechanism. The knob 203 moves counter-clockwise by the force of the spring 208 and is reset in position by merely relieving the gripping force on the knob 203. Suppose that the knob 203 is continuously held by hand with the knob 203 kept in its position of being turned clockwise until one cycle of the operation of the automatic mechanism terminates. In such a case, the extension 175 of the friction lever 99 is urged by the pin 195 fixed on the gear 240 near the end of one rotation of the gear 240 so that the friction lever 99 is rotated clockwise about the shaft 98 in FIG. 6 and at the same time the lateral extension 233 of the lever 99 urges the tip portion 232 of the cut lever 198 in FIG. 9. The cut lever 198 however can not rotate clockwise about the shaft 197 as the knob 203 is held by hand and is kept in its clockwise rotated position. The cut lever 198 therefore moves along the slot 199 against the force of the spring 208 without imparting any excessive force to the rod 202 and any other members. When the gripping force on the knob 203 is released under such state, the cut lever 198 moves in the opposite direction along the slot 199 by the force of the spring 208 and is reset at the original operative position.

According to the invention, an elongated opening 246 must be provided in the wall of the chassis 27 as shown in FIGS. 1 and 2 in order to permit the linear movement of the supporting members for the tone arm 21. Therefore dust and the like may intrude into the record player from above the chassis 27 and may adversely affect the operation of the automatic mechanism including the cylinder 26 by depositing thereon. Another feature of the present invention is that the bracket 24 is suitably bent and a cover 247 is suitably fitted in the space thereby defined as shown in FIG. 2 to cover the elongated opening 246 of the chassis 27. By the provision of the cover 247, possibility of intrusion of dust and the like into the chassis 27 can considerably be reduced.

It is apparent that various modifications may be made without departing from the substantial properties of the present invention. The above-described specific examples are intended to merely illustrate the various facets in a certain selective embodiment of the present invention and it is to be understood that the scope of the present invention is limited only by the appended claims.

What I claim is:

1. A phonograph comprising a chassis and a turntable mounted thereon, carrier member means movably disposed in said chassis so as to travel along a path parallel with the line joining the point of pickup needle placed on the edge of a record placed upon said turntable and the center of said record, bracket means mounted for horizontal pivotal movement on said carrier member means, a rotary cylinder rotatably supported in said chassis and having its axis disposed in parallel with the path of said carrier member means, a tone arm mounted for vertical pivotal movement on said bracket means, a roller supported by said bracket means in a manner to make rolling contact with said rotary cylinder and having its axis of rotation arranged at right angles with respect to the line connecting said pickup needle with the axis of horizontal pivotal movement of said tone arm, and means for causing the vertical pivotal movement of said tone arm in a direction in which said pickup needle is lifted away from the record and for forcedly inclining the axis of rotation of said roller with respect to the axis of rotation of said rotatory cylinder to effect automatic return of said tone arm to its rest position.

2. A phonograph according to claim 1, in which said means for causing vertical pivotal movement of said tone arm in a direction in which said pickup needle is lifted away from the record and for forcedly inclining the axis of rotation of said roller with respect to the axis of rotation of said rotatory cylinder are provided on said carrier member means.

3. A phonograph according to claim 1, in which said means for causing vertical pivotal movement of said tone arm in a direction in which said pickup needle is lifted away from the record and for forcedly inclining the axis of rotation of said roller with respect to the axis of rotation of said rotatory cylinder are provided on said carrier member means, and link means is provided to drive said means provided on said carrier member means, said link means being so disposed as to make parallel motion towards and away from said rotatory cylinder in parallel relation with the axis of rotation of the latter.

4. A phonograph according to claim 3, in which said first-mentioned means comprises levers for causing up-down movement of said tone arm provided on said carrier member means, levers for forcedly inclining the axis of rotation of said roller with respect to the axis of rotation of said rotatory cylinder, and an actuating lever for actuating both of said levers, said actuating lever being driven by said link means which makes parallel motion towards and away from said rotatory cylinder in parallel relation with the axis of rotation of the latter.

5. A phonograph according to claim 3, in which means are provided to clamp said means for causing vertical pivotal movement of said tone arm in a direction in which said pickup needle is lifted away from the record and for forcedly inclining the axis of rotation of said roller with respect to the axis of rotation of said rotatory cylinder, said clamping means being operative to hold said tone arm in its lifted position until said tone arm is returned to its rest position and to hold the axis of rotation of said roller inclined with respect to the axis of rotation of said rotatory cylinder.

6. A phonograph according to claim 4, in which means are provided to clamp said levers for forcedly inclining the axis of rotation of said roller with respect to the axis of rotation of said rotatory cylinder until such time at which said tone arm is returned towards its rest position and is moved downwardly to be seated on the rest.

7. A phonograph according to claim 4, in which means are provided to temporarily clamp said actuating lever to prevent contact between said actuating lever and said link means during a period in which said tone arm makes its automatic return to its rest position.

8. A phonograph according to claim 4, in which a pin is secured to said bracket means having said roller rotatably mounted therein and is arranged to be forced by said levers operated from said actuating lever so that said bracket means thereby makes horizontal pivotal movement to effect the forced inclination of the axis of rotation of said roller with respect to the axis of rotation of said rotatory cylinder.

9. A phonograph according to claim 4, in which a roller is provided at that portion of said actuating lever at which said actuating lever contacts said link means which makes parallel motion towards and away from said rotatory cylinder in parallel relation with the axis of rotation of the latter.

10. A phonograph according to claim 2, in which said tone arm is provided with a tail which when suitably urged can cause the vertical pivotal movement of said tone arm in a direction to cause upward movement of said pickup needle away from the record.

11. A phonograph according to claim 3, further comprising a driven gear of large diameter, clutch means operatively associated with said turntable for controlling transmission of rotation to said gear from said turn table, more than two pins provided on said gear, said pins being operative to effect the parallel motion of said link means towards and away from said rotatory cylinder in parallel relation with the axis of rotation of said rotatory cylinder, and a lever operatively connected with said link means, said lever being forced between the two of said pins when said gear ceases its rotation by being driven to its inoperative position by said clutch means whereby said gear can stably be kept in its non-rotating state.

12. A phonograph comprising a chassis, carrier member means movably disposed in said chassis so as to travel along a path parallel with the line connecting the point of a pickup needle on an edge of a record placed upon a turntable mounted upon said chassis with the center of said record, bracket means mounted for horizontal pivotal movement on said carrier member means, a rotatory cylinder rotatably supported in said chassis and having its axis disposed in parallel with the path of said carrier member means, a tone arm mounted for vertical pivotal movement on said bracket means, a roller supported by said bracket means in a manner to make rolling contact with said rotatory cylinder and having its axis of rotation arranged at right angles with respect to the line connecting said pickup needle with the axis of horizontal pivotal movement of said tone arm, means for causing the vertical pivotal movement of said tone arm in a direction in which said pickup needle is lifted away from the record and for forcedly inclining the axis of rotation of said roller with respect to the axis of rotation of said rotatory cylinder to effect automatic return of said tone arm to its rest position, and switch means to maintain a turntable drive motor in its "on" state during such time in which said tone arm is not at its rest position but is positioned inwardly towards the record and in which said means for forcedly inclining the axis of rotation of said roller with respect to the axis of rotation of said rotatory cylinder to effect the automatic return of said tone arm to its rest position are in operation.

13. A phonograph according to claim 12, in which said roller is disposed in a manner that its axis of rotation is at an inclinded angle with respect to the axis of rotation of said rotatory cylinder when said tone arm is at its rest position, and means is provided to utilize a force of movement of said carrier member means caused by the above angular relation between said roller and said cylinder, said means being operative to actuate said switch means to turn off the power supply to said motor when said tone arm is seated at its rest position.

14. A phonograph comprising a chassis, carrier member means movably disposed in said chassis so as to travel along a path parallel with the line connecting the point of a pickup needle on an edge of a record placed upon a turntable mounted upon said chassis with the center of said record, bracket means mounted for horizontal pivotal movement on said carrier member means, a rotatory cylinder rotatably supported in said chassis and having its axis disposed in parallel with the path of said carrier member means, a tone arm mounted for vertical pivotal movement on said bracket means, a roller supported by said bracket means in a manner to make rolling contact with said rotatory cylinder and having its axis of rotation arranged at right angles with respect to the line connecting said pickup needle with the axis of horizontal pivotal movement of said tone arm, means for causing the vertical pivotal movement of said tone arm in a direction in which said pickup needle is lifted away from the record and for forcedly inclining the axis of rotation of said roller with respect to the axis of rotation of said rotatory cylinder to effect automatic return of said tone arm to its rest position, and starting means for placing in operation said means for effecting the automatic return of said tone arm to its rest position, said starting means being actuated by a force of movement of said carier member means caused by a component of rotating force imparted from said cylinder to said roller when quick feed is applied to said tone arm by the lead-out groove of the record.

15. A phonograph according to claim 14, in which said starting means comprises a first gear of small diameter rotating with said turn table, a second gear of large diameter for driving said automatically returning means, clutch means for causing engagement and disengagement of said gears, a friction lever for actuating said clutch means, an arm disposed for pivotal movement in coaxial relation with said friction lever, a detection lever pivotally mounted on said arm by a pin so as to be rotated by said carrier member means, and a spring tensioned between said arm and said detection lever, said spring being operative to press one end of said detection lever against the boss of said friction lever to impart suitable friction to said friction lever.

16. A phonograph according to claim 15, in which automatic-manual change-over means is provided in order to urge said automatically returning means to the inoperative state, said change-over means being operative to rotate said detection lever in a direction away from said carrier member means so that said detection lever may not be abutted by said carrier member means even when said carrier members are moved towards it by the quick feed applied to said tone arm by the lead-out groove of the record.

17. A phonograph according to claim 14, in which halfway returning means are provided so that said starting means can manually be placed in operation to attain the automatic return of said tone arm to its rest position from whatever intermediate position of said tone arm on the record, said halfway returning means including a cut lever therein, said cut lever having a slot with which it fits on a pivot, said slot extending in such a direction in which said starting means are urged for operation.

18. A phonograph according to claim 1, in which said bracket means having said tone arm mounted thereon is suitable bent at a portion passing downwardly through an elongated opening of said chassis, and a cover member is provided above said elongated opening to cover the same.

No references cited.

LEONARD FORMAN, *Primary Examiner.*

F. J. D'AMBROSIO, *Assistant Examiner.*